United States Patent
Yamamoto et al.

(10) Patent No.: US 9,817,291 B2
(45) Date of Patent: Nov. 14, 2017

(54) LIQUID CRYSTAL DISPLAY DEVICE

(71) Applicant: Japan Display Inc., Minato-ku (JP)

(72) Inventors: Koji Yamamoto, Minato-ku (JP);
Akihiko Saitoh, Minato-ku (JP);
Seiichi Sato, Minato-ku (JP); Nobuko Fukuoka, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 45 days.

(21) Appl. No.: 14/994,676

(22) Filed: Jan. 13, 2016

(65) Prior Publication Data
US 2016/0223876 A1   Aug. 4, 2016

(30) Foreign Application Priority Data
Jan. 29, 2015 (JP) ................................ 2015-015039

(51) Int. Cl.
| G02F 1/1343 | (2006.01) |
| G02F 1/1333 | (2006.01) |
| G02F 1/1337 | (2006.01) |
| G02F 1/1368 | (2006.01) |
| G02F 1/1339 | (2006.01) |
| G02F 1/1362 | (2006.01) |

(52) U.S. Cl.
CPC .. G02F 1/136286 (2013.01); G02F 1/133345 (2013.01); *G02F 2001/133388* (2013.01); *G02F 2001/134372* (2013.01)

(58) Field of Classification Search
None
See application file for complete search history.

(56) References Cited

U.S. PATENT DOCUMENTS

| 2009/0251653 A1* | 10/2009 | Hayashi | H01L 27/1288 349/139 |
| 2011/0050551 A1* | 3/2011 | Ota | G02F 1/134363 345/87 |
| 2011/0183451 A1* | 7/2011 | Tanaka | G02F 1/133512 438/30 |
| 2011/0316803 A1* | 12/2011 | Kim | G06F 3/044 345/173 |

(Continued)

FOREIGN PATENT DOCUMENTS

| JP | 2007-164161 | 6/2007 |
| JP | 2013-205504 | 10/2013 |

*Primary Examiner* — Ryan Crockett
(74) *Attorney, Agent, or Firm* — Oblon, McClelland, Maier & Neustadt, L.L.P.

(57) ABSTRACT

According to one embodiment, provide is a liquid crystal display device that suppresses potential change of a common electrode caused by potential change of a signal line. An electrode part is provided on an array substrate so as to surround a display region. A signal line is provided on the array substrate so as to be located in the display region. A passivation film is provided on the array substrate so as to cover at least the signal line and the electrode part. A one-side opening part is provided continuously along an edge part of the display region on the passivation film so that the electrode part is disposed. The common electrode is provided on the array substrate so that a part of the common electrode is located at the one-side opening part and another part of the common electrode is located facing the signal line on the passivation film.

19 Claims, 2 Drawing Sheets

(56) References Cited

U.S. PATENT DOCUMENTS

2013/0258221 A1* 10/2013 Fujimoto .......... G02F 1/133345
    349/33
2014/0176838 A1* 6/2014 Hong ................ G02F 1/134363
    349/33
2015/0029434 A1* 1/2015 Kim ...................... G02F 1/1345
    349/46

* cited by examiner

LIQUID CRYSTAL DISPLAY DEVICE

INCORPORATION BY REFERENCE

The present invention claims priority under 35 U.S.C. §119 to Japanese Patent Application No. 2015-015039 filed on Jan. 29, 2015. The content of the application is incorporated herein by reference in its entirety.

FIELD

Embodiments described herein relate generally to a liquid crystal display device which displays an image in a display region.

BACKGROUND

As a conventional liquid crystal display device, a device having a transverse electric field mode such as an IPS mode is used, which has, for example, pixel electrodes and a common electrode provided on an array substrate so as to make liquid crystal material fall by using a transverse electric field generated between these pixel electrodes and the common electrode.

When the common electrode is disposed on the array substrate in this way, it tends to form parasitic capacitance with respect to a signal line, thus also receiving potential change interlocking with the potential change of the signal line. Such potential change of the common electrode decreases the potential difference between a pixel electrode and a counter electrode, thereby causing degradation in image quality due to insufficient desired brightness obtained at the pixel.

Therefore, the common electrode located on the array substrate is desired to be insusceptible to the effect of potential change of a signal line.

DETAILED DESCRIPTION

A liquid crystal display device of the embodiment includes a pair of substrates disposed so as to face to each other and a liquid crystal layer disposed between these substrates, and displays an image in a display region. The liquid crystal display device includes a conductive electrode part, a signal line, a one-side covering layer, a one-side opening part, a common electrode, an interlayer insulation film, and pixel electrodes. The electrode part is provided on either one of the substrates so as to surround the display region. The signal line is provided on either one of the substrates so as to be at least partially located in the display region, and supplies a video signal. The one-side covering layer is provided on either one of the substrates so as to cover at least the signal line and the electrode part. The one-side opening part is provided on the one-side covering layer so as to make the electrode part be exposed continuously along the edge part of the display region. The common electrode is provided on either one of the pair of substrates so that a part of the common electrode is located at the one-side opening part and another part of the common electrode is located on the one-side covering layer so as to face the signal line. The interlayer insulation film is provided on either one of the substrates so as to cover the common electrode. The pixel electrodes are provided in the display region on the interlayer insulation film on either one of the substrates, thereby being driven in accordance with the video signal and forming an electric field to drive the liquid crystal layer between the pixel electrode and the common electrode.

A configuration of an embodiment will be described with reference to drawings.

Figure 1:
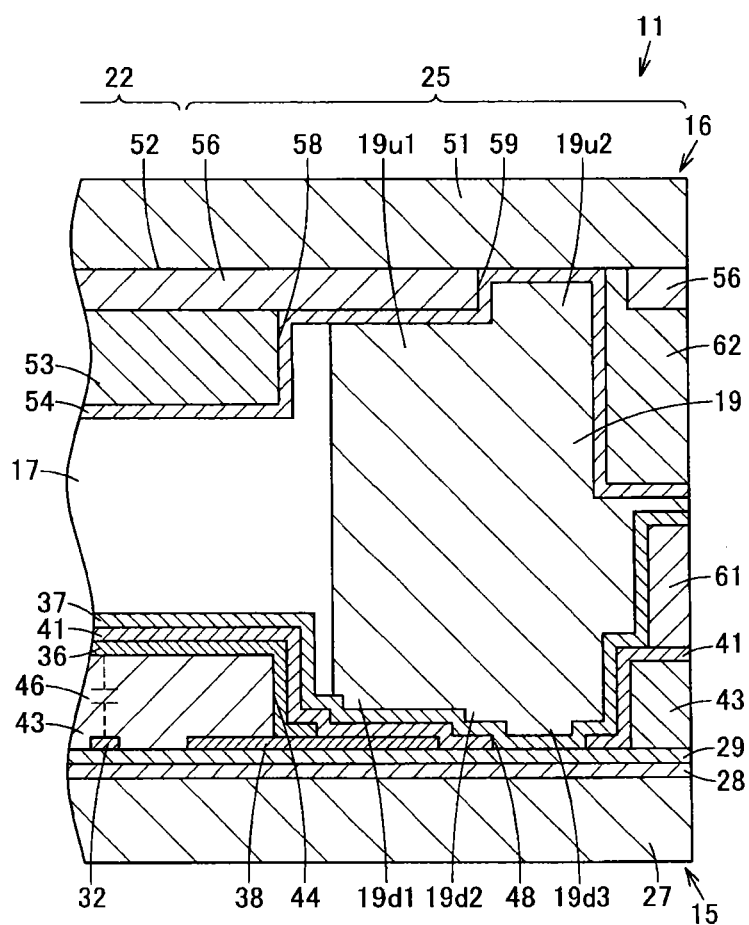
FIG. 1 is a sectional view illustrating a part of a liquid crystal display device of an embodiment in an enlarged manner.
Figure 2A:
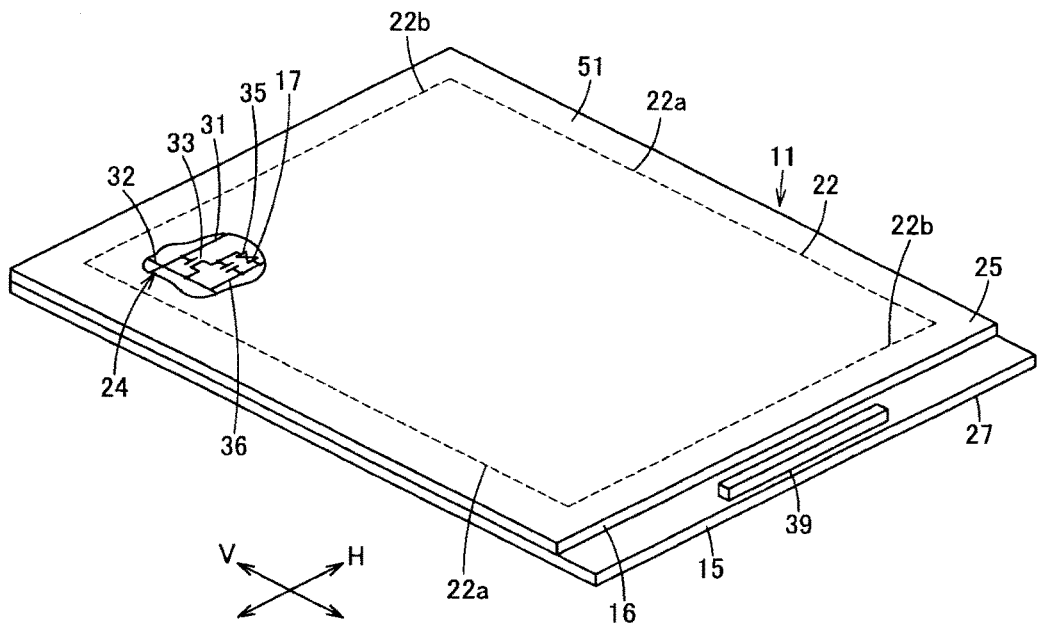
FIG. 2A is a perspective view schematically illustrating the same liquid crystal display device.
Figure 2B:
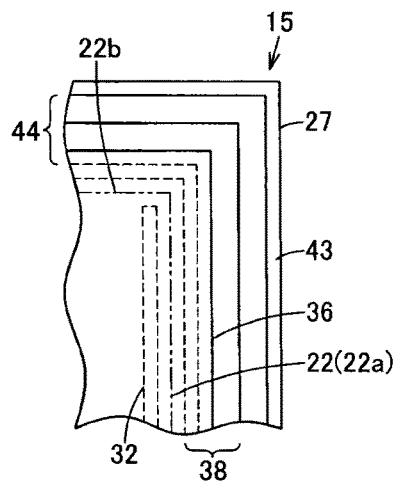
FIG. 2B is a plan view illustrating a part of a one-side substrate in an enlarged manner.
Figure 2C:
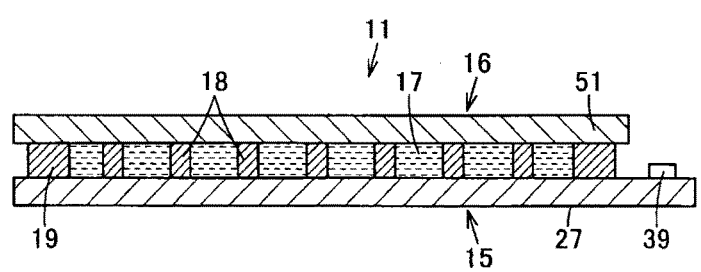
FIG. 2C is a sectional view schematically illustrating the same liquid crystal display device.

In FIG. 1, FIG. 2A and FIG. 2C, reference numeral 11 indicates a liquid crystal display device. The liquid crystal display device 11 is an active matrix type liquid crystal panel of a transmissive type that displays an image by transmitting planar light emitted from, for example, a backlight disposed on the back side thereof, not shown in the drawings. In this embodiment, the liquid crystal display device 11 corresponds to a transverse electric field type such as an IPS mode or an FFS mode.

That is, the liquid crystal display device 11 includes, for example, an array substrate 15 corresponding to a first substrate as a (one-side) square shape substrate and a counter substrate 16 corresponding to a second substrate as a (other-side) square shape substrate which are disposed facing each other. In addition, the liquid crystal display device 11 includes, between these substrates 15 and 16, a liquid crystal layer 17 as an optical modulation layer and a spacer 18 that holds a constant gap therebetween, and a sealing part 19 as a bonding layer that bonds the peripheral parts of the substrates 15 and 16. As shown in FIG. 1 and FIG. 2A, in a square shape (a rectangular shape) display region 22 located in the central area of the liquid crystal display device 11, a plurality of pixels (subpixels) 24 are disposed in a matrix, particularly respectively along a vertical direction (a row direction) corresponding to a first direction shown by an arrow V and a horizontal direction (a column direction) corresponding to a second direction substantially orthogonal to the vertical direction, shown by an arrow H. Moreover, a peripheral region 25 corresponding to a non-display region is formed in a picture frame shape surrounding the area around the display region 22. In addition, the liquid crystal display device 11 includes polarizing plates, not shown in the drawings, attached respectively on the display side of the array substrate 15 and on the rear (back) side of the counter substrate 16.

The array substrate 15 includes, for example, a glass substrate 27 as a first substrate body corresponding to a substrate having light transmitting properties and insulating properties. On the liquid crystal layer 17 side of the glass substrate 27, a silicon nitride film 28 and a silicon oxide film 29 are formed as undercoat layers. On the silicon oxide film 29, a plurality of scanning lines (gate lines) 31 are disposed apart from each other along the horizontal direction, while a plurality of signal lines (source lines) 32 are disposed apart from each other along the vertical direction. The scanning lines 31 and the signal lines 32 electrically insulated therebetween are disposed in a lattice pattern. Thin film transistors (TFT) 33 respectively corresponding to switching elements are provided at positions where the scanning lines 31 and the signal lines 32 intersect, mostly in the display region 22. Each of the pixel electrodes 35 constituting each of the pixels 24 and a common electrode (counter electrode)

36 forming a transverse electric field to drive the liquid crystal layer 17 cooperating with each of the pixel electrodes 35 are disposed in each of the locations surrounded by the scanning lines 31 and the signal lines 32 in the display region 22. An alignment film 37 is formed so as to cover the crystal layer 17 side of the pixel electrode 35. In the peripheral region 25 on the array substrate 15, a conductive electrode part 38 electrically connected to the common electrode 36, a driving circuit 39 for controlling driving of each of the thin film transistors 33 and the like are provided. In order to provide a clearer description below, the horizontal direction shown by the arrow H is indicated as a left-and-right direction; while the vertical direction shown by the arrow V is indicated as an up-and-down direction.

The thin film transistors 33 may be of a top gate type, a bottom gate type, or the like. Using a top gate type transistor as an example in the description below, a gate electrode is disposed on the gate insulation film that covers an island-shaped semiconductor layer not shown in the drawings; the gate electrode is covered by a protective film; and a source electrode and a drain electrode are formed on the protective film. In addition, the gate electrode is connected to one of the scanning lines 31 and the source electrode is connected to one of the signal lines 32. Further, the pixel electrodes 35 respectively forming the pixels 24 are respectively connected to the drain electrodes. The thin film transistors 33 are controlled in switching when a signal from the driving circuit 39 is applied via the scanning lines 31 to the gate electrodes, and write the signal respectively in the pixel electrodes 35 in accordance with the video signal input via the signal lines 32 from the driving circuit 39, thereby turning on/off the pixels 24 individually.

Each of the pixel electrodes 35 is formed in a comb tooth shape or the like by way of film formation and patterning by the use of transparent conductive material, for example, ITO (Indium Tin Oxide) or the like. The pixel electrodes 35 are formed on an interlayer insulation film 41 formed of, for example, a silicon nitride film or the like, which covers, for example, the common electrode 36 so as to be electrically insulated against the common electrode 36.

The common electrode 36 is formed substantially on the whole area of the display region 22 and also partially on the peripheral region 25 by way of planar film formation and patterning by use of transparent conductive material, for example, ITO (Indium Tin Oxide) or the like so as to face all of the pixel electrodes 35 via the interlayer insulation film 41. The common electrode 36 is formed on a passivation film 43 corresponding to a protective layer as a one-side covering layer that covers, for example, the signal lines 32 (source electrodes and drain electrodes), so as to cover at least a part of a one-side opening part 44 which is open in the passivation film 43 (corresponding to the side of the display region 22 in the embodiment), and is electrically connected to the electrode part 38 exposed at the one-side opening part 44. That is, the common electrode 36 faces the signal lines 32 at least via the passivation film 43, and forms a parasitic capacitance 46 between the common electrode 36 and the signal lines 32. Thus, the one-side opening part 44 functions as a contact hole for conduction between the common electrode 36 and the electrode part 38.

The passivation film 43 corresponds to a first insulation film, for example, an organic flattening film, which insulates between the common electrode 36 and the source electrodes and the like. The passivation film 43 is formed from the display region 22 over to the peripheral region 25, corresponding to substantially the whole area of the array substrate 15. Moreover, a part of the passivation film 43 located at the end part of the array substrate 15 is covered by a part of the interlayer insulation film 41.

The one-side opening part 44 corresponds to a first groove part formed in a groove shape at a location facing the electrode part 38 of the passivation film 43. In this embodiment, the one-side opening part 44 is formed continuously in a U-shape at a location apart inward (to the side of the display region 22) from the outer end part (the outer peripheral part) of the array substrate 15 on the peripheral region 25 along the location of both longer sides 22a and 22a and one shorter side 22b of the display region 22. By providing the one-side opening part 44, a part of the electrode part 38 and the silicon oxide film 29 corresponding to a lower layer of the electrode part 38 at the side part on the opposite side of the display region 22 of the electrode part 38 are both exposed. Moreover, at the one-side opening part 44, the interlayer insulation film 41 corresponding to a second insulation film that covers the common electrode 36 is disposed, and a (one-side) communication opening part 48 which is open in the interlayer insulation film 41 communicates with the one-side opening part 44.

The alignment film 37 is a horizontal alignment film that is formed with synthetic resin, for example, polyimide or the like so as to cover the whole area of the liquid crystal layer 17 side of the array substrate 15. That is, the alignment film 37 is formed so as to cover the one-side opening part 44 and the communication opening part 48.

The electrode part 38 corresponds to power feed wiring (bus line) connected to the outside, which sets the common electrode 36 at a predetermined potential, for example, a common potential. Moreover, the electrode part 38 is formed of a metal such as an aluminum member, for example, corresponding to a conductive member having electric resistivity similar to that of, for example, the signal lines 32 or the like and further smaller than that of the common electrode 36, and is disposed on the same layer as, for example, the signal lines 32. The electrode part 38 is disposed continuously in a belt-like U-shape along the locations of the both longer sides 22a and 22a and one shorter side 22b of the display region 22, and the inner side thereof (the side of the display region 22) is covered by the passivation film 43, while the outer side thereof is located in the one-side opening part 44. Further, the common electrode 36 is laminated on the outer side (FIG. 2B). The alignment film 37, the interlayer insulation film 41 and the like of the array substrate 15 are omitted in FIG. 2B in order to more clearly illustrate the arrangement of the common electrode 36, the electrode part 38 and the one-side opening part 44.

The driving circuit 39 is disposed along the location of the other shorter side 22b of the display region 22, and is electrically connected such as to the signal lines 32 led out from the display region 22 to the peripheral region 25, and is also electrically connected to an external circuit via a flexible print substrate or the like not shown in the drawings.

The counter substrate 16 includes a glass substrate 51 as a second substrate body having light transmitting properties, and various layers are laminated sequentially on the glass substrate 51 such as of a color filter layer 52 corresponding to a colored layer, an overcoat layer 53 corresponding to a flattening layer as the other-side covering layer that covers the color filter layer 52, an (other-side) alignment film 54 for aligning liquid crystal material in the liquid crystal layer 17 or the like.

The color filter layer 52 includes filter parts, not shown in the drawings, respectively corresponding to, for example, red, green and blue, disposed at the locations of the pixels 24, and also includes a shielding part (black matrix) 56 that partitions the filter parts to shield unwanted light. The color filter layer 52 may be disposed on the array substrate 15.

The overcoat layer 53 is formed substantially on the whole area of the counter substrate 16 so as to cover and make the color filter layer 52 flattened. An other-side opening part 58 is formed at a location in the peripheral region 25 on the overcoat layer 53. The other-side opening part 58 corresponds to a second groove part that is formed in a groove shape on the array substrate 15 at a location facing the one-side opening part 44 of the overcoat layer 53. That is, in this embodiment, the other-side opening part 58 is formed continuously in a U-shape in the peripheral region 25 along the locations of the both longer sides 22a and 22a and one shorter side 22b of the display region 22. Moreover, at the other-side opening part 58, the shielding part 56 on the color filter layer 52 is partially exposed. Further, the glass substrate 51 is partially exposed in a state where communication with a (other-side) communication opening part 59 open in the shielding part 56 is provided.

The alignment film 54 is a horizontal alignment film that is formed with synthetic resin, for example, polyimide or the like, so as to cover the whole area of the liquid crystal layer 17 side of the counter substrate 16. That is, the alignment film 54 is formed so as to cover the other-side opening part 58 and the communication opening part 59.

The liquid crystal layer 17 corresponds to an optical modulation layer formed with predetermined liquid crystal material. The liquid crystal layer 17 is sandwiched by the array substrate 15 and the counter substrate 16 and is surrounded by the sealing part 19, and the liquid crystal material constituting the liquid crystal layer 17 is controlled in alignment by the alignment films 37 and 54. The liquid crystal material is driven by the transverse electric field formed between each of the pixel electrodes 35 and the common electrode 36 so as to rotate the polarization surface of the light that has been irradiated from a backlight and has then passed through the polarizing plate on the array substrate 15.

The spacer 18 is formed with a member having, for example, light transmitting properties on the array substrate 15 in this embodiment. However, the spacer 18 may be formed on the counter substrate 16.

The sealing part 19 is formed by hardening a fluid sealing member that is cured by ultraviolet (UV) rays or heating, that is, ultraviolet curable resin or thermosetting resin. The sealing part 19 is formed into a shape surrounding the area around the display region 22, that is, a square frame shape in this embodiment at a location apart inward from the outer edges of both the substrates 15 and 16. At the locations of the both longer sides 22a and 22a and one shorter side 22b of the display region 22, the bottom part of the sealing part 19 is located at the one-side opening part 44 (and the communication opening part 48), and the upper part thereof is located at the other-side opening part 58 (and the communication opening part 59). That is, the sealing part 19 is disposed between the opening parts 44 and 58. Thus, the sealing part 19 includes, on the array substrate 15 in the order from the display region 22 toward the outer edge part, a bottom first part 19d1, a bottom second part 19d2, and a bottom third part 19d3. The bottom first part 19d1 is located on the silicon nitride film 28, the silicon oxide film 29, the electrode part 38, the interlayer insulation film 41 and the alignment film 37. The bottom second part 19d2 is located on the silicon nitride film 28, the silicon oxide film 29, the interlayer insulation film 41, and the alignment film 37. The bottom third part 19d3 is located on the silicon nitride film 28, the silicon oxide film 29, and the alignment film 37.

Moreover, the sealing part 19 includes, on the counter substrate 16 in the order from the display region 22 toward the outer edge part, an upper first part 19u1 and an upper second part 19u2. The upper first part 19u1 is located on the shielding part 56 and the alignment film 54 and also above the bottom first part 19d1 and the bottom second part 19d2. The upper second part 19u2 is located on the alignment film 54 and also above the bottom second part 19d2 and the bottom third part 19d3. Thus, the sealing part 19 directly bonds the silicon oxide film 29 on the array substrate 15 and the glass substrate 51 on the counter substrate 16 via the alignment films 37 and 54.

Each of the liquid crystal display devices 11 is made by separately cutting off from a mother substrate corresponding to a large substrate not shown in the drawings. Thus, the passivation film 43 and the interlayer insulation film 41 are also laminated on the outer side of the sealing part 19 on the end part of the array substrate 15 corresponding to the cutting-off region. Moreover, on the corresponding interlayer insulation film 41, a spacer 61 that is lower in height than the spacer 18 disposed in the display region 22 is provided, for example, with the same material and by the same process as the spacer 18 (FIG. 1). Similarly, on the end part of the counter substrate 16 corresponding to the cutting-off region, an overcoat layer 62 that is higher in height (thicker film) than the overcoat layer 53 formed on the shielding part 56 in the display region 22 is provided, for example, with the same material and by the same process as the overcoat layer 53 so as to face the spacer 61 (FIG. 1). That is, the overcoat layer 62 constitutes a third insulation film, as well as the overcoat layer 53. The overcoat layer 62 constitutes the side face of the other-side opening part 58. In this embodiment, the spacer 61 and the overcoat layer 62 are configured to be disposed apart from each other, that is, a part of the sealing part 19 is sandwiched by the spacer 61 and the overcoat layer 62. However, the spacer 61 and the overcoat layer 62 may be configured to come into contact with each other with the alignment films 37 and 54 sandwiched therebetween and without the sealing part 19 disposed therebetween.

On the liquid crystal display device 11, the driving circuit 39 outputs a signal to the scanning lines 31 so as to turn on the thin film transistors 33, the gate electrodes of which are electrically connected to the scanning lines 31, to supply a video signal via the signal lines 32. Then, the signal is written to the pixel electrodes 35 of the pixels 24, and the liquid crystal material in the liquid crystal layer 17 is driven by the transverse electric field generated between the pixel electrodes 35 and the common electrode 36.

In the aforementioned embodiment, the one-side opening part 44 is provided continuously along the edge part of the display region 22 so that the electrode part 38 is exposed, thus allowing the common electrode 36 to have lower resistance due to reduced contact resistance between the common electrode 36 and the electrode part 38. This improves power supply capability to the common electrode 36 and decreases the potential change of the common electrode 36, which occurs because of potential change of the signal lines 32 and which is caused by the parasitic capacitance 46 between the signal lines 32 and the common electrode 36. This prevents degradation in image quality caused by insufficient writing to the pixel electrodes 35, more specifically, the degradation in image quality caused such as when the potential difference between the pixel electrodes 35 and the common electrode 36 is small and thus desired brightness is not obtained. Further, the liquid crystal display device 11 combined with a touch panel allows noise on the touch panel reduced. Moreover, the process of manufacturing the liquid crystal display device is not changed from the process of manufacturing conventional devices having a large number of dot-shaped one-side opening parts, thus not increasing cost in manufacturing.

In particular, the formation of a part of the one-side opening part 44 along a longer side 22a of the display region 22 allows the opening area of the one-side opening part 44, that is, the area of the electrode part 38 exposed from the one-side opening part 44, to be made wider, thus allowing further reduction of the contact resistance between the common electrode 36 and the electrode part 38. Further in this embodiment, the formation of the one-side opening part 44 continuously in a U-shape including the both longer sides 22a and 22a and one shorter side 22b of the display region 22 allows the opening area of the one-side opening part 44, that is, the area of the electrode part 38 exposed from the one-side opening part 44, to be made even wider, thus allowing even further reduction of the contact resistance between the common electrode 36 and the electrode part 38.

Further, the arrangement of the sealing part 19 so as to be partially located at the one-side opening part 44 on the array substrate 15 and the other-side opening part 58 on the counter substrate 16 reduces the number of layers under the sealing part 19, thus increasing reliability and strength of bonding by the sealing part 19, and also suppressing dispersion of the width of the sealing part 19 due to a larger application cross-sectional area of the sealing part 19.

In the aforementioned embodiment, the one-side opening part 44 may be formed along at least one longer side 22a of the display region 22.

Further, the aforementioned liquid crystal display device 11 is described as a transmissive type. However, the aforementioned liquid crystal display device 11 can also be a reflective type or a semi-transmissive type.

While a certain embodiment of the present invention has heretofore been described, the embodiment has been presented by way of example only and is not intended to limit the scope of the invention. For example, the display device may be an organic EL display device and the like, in place of the liquid crystal display device. Indeed, the novel embodiment described herein may be embodied in a variety of other forms; furthermore, various omissions, substitutions, and variations may be made without departing from the spirit of the invention. The appended claims and their equivalents are intended to cover the embodiment and its modifications as would fall within the scope and spirit of the invention.

What is claimed is:

1. A liquid crystal display device comprising:
   a pair of substrates disposed so as to face to each other;
   a liquid crystal layer disposed between the substrates;
   a conductive electrode part that is located on one of the substrates so as to surround a display region where an image is displayed;
   a signal line that is provided on the one of the substrates so as to be at least partially located in the display region, and that supplies a video signal;
   a one-side covering layer that is provided on the one of the substrates so as to cover at least the signal line and the conductive electrode part;
   a one-side opening part that is provided continuously along an edge part of the display region on the one-side covering layer so that the conductive electrode part is exposed;
   a common electrode that is provided on the one of the substrates so that a part of the common electrode is located at the one-side opening part and connected to the conductive electrode part and another part of the common electrode is located facing the signal line on the one-side covering layer;
   an interlayer insulation film that is provided on the one of the substrates so as to cover the common electrode; and
   a pixel electrode that is provided in the display region on the interlayer insulation film on the one of the substrates, and that is driven in accordance with the video signal and also forms between the pixel electrode and the common electrode an electric field to drive the liquid crystal layer.

2. The liquid crystal display device according to claim 1, wherein
   the display region is formed in a rectangular shape, and
   the one-side opening part is provided continuously along at least one longer side of the display region on the one-side covering layer.

3. The liquid crystal display device according to claim 2, wherein
   the one-side opening part is provided continuously along both longer sides of the display region and either one of shorter sides of the display region respectively on the one-side covering layer.

4. The liquid crystal display device according to claim 1, comprising
   a sealing part that bonds the pair of substrates so as to surround the liquid crystal layer, wherein
   the other of the substrates includes;
   an other-side covering layer; and
   an other-side opening part that is provided on the other-side covering layer so as to at least partially face the one-side opening part, and wherein
   the sealing part is disposed so as to be at least partially located at the one-side opening part and the other-side opening part.

5. A liquid crystal display device, comprising:
   a first substrate;
   a second substrate disposed so as to face the first substrate;
   a liquid crystal layer disposed between the first substrate and the second substrate; and
   a sealing part that bonds the first substrate and the second substrate so as to surround the liquid crystal layer, wherein
   the first substrate includes:
   at least one thin film transistor formed in a display region where an image is displayed;
   a first insulation film that covers the thin film transistor;
   a common electrode formed on the first insulation film;
   a second insulation film formed on the common electrode; and
   a power feed wiring that is formed in a peripheral region surrounding the display region, and that is disposed along an edge part of the display region, and wherein
   the first insulation film has a first groove part formed continuously along the edge part of the display region in the peripheral region, and
   the common electrode extends from the display region to the peripheral region, and is electrically connected to the power feed wiring at the first groove part.

6. The liquid crystal display device according to claim 5, wherein
   the first substrate includes:
   a first substrate body;
   an undercoat layer that covers the first substrate body;
   the power feed wiring formed on the undercoat layer;

the second insulation film that covers the power feed wiring; and an alignment film that covers the second insulation film, and wherein the first groove part has a first part located on the alignment film.

7. The liquid crystal display device according to claim 5, wherein the first substrate includes:

a first substrate body;

an undercoat layer that covers the first substrate body;

the second insulation film that covers the undercoat layer; and an alignment film that covers the second insulation film, and wherein the first groove part has a second part located on the alignment film.

8. The liquid crystal display device according to claim 5, wherein the first substrate includes:

a first substrate body;

an undercoat layer that covers the first substrate body; and an alignment film that covers the undercoat layer, and wherein the first groove part has a third part located on the alignment film.

9. The liquid crystal display device according to claim 5, wherein the first substrate includes:

a first substrate body;

an undercoat layer that covers the first substrate body;

the power feed wiring formed on the undercoat layer;

the second insulation film that covers the power feed wiring and the undercoat layer; and an alignment film that covers the second insulation film and the undercoat layer, and wherein the first groove part has a first part, a second part and a third part from a side of the display region to an outer edge part side, the first part being located on the alignment film above the power feed wiring, the second part being located on the alignment film above a part of the second insulation film that covers the undercoat layer, the third part being located on the alignment film that covers the undercoat layer.

10. The liquid crystal display device according to claim 5, wherein the first groove part is located between the display region and a part of the first insulation film located at an end part of the first substrate in the peripheral region.

11. The liquid crystal display device according to claim 10, wherein a part of the second insulation film is formed on a part of the first insulation film located at the end part of the first substrate.

12. The liquid crystal display device according to claim 11, comprising an alignment film partially located on the second insulation film formed on a part of the first insulation film.

13. The liquid crystal display device according to claim 5, wherein the second substrate includes:

a shielding part located in the peripheral region; and a third insulation film located on the shielding part, and wherein the third insulation film has a second groove part formed at a location facing the first groove part.

14. The liquid crystal display device according to claim 13, wherein the second substrate includes an alignment film that covers the shielding part, and the second grove part has a first part located on the alignment film.

15. The liquid crystal display device according to claim 13, wherein the second substrate includes:

a second substrate body; and an alignment film that covers the second substrate body, and wherein the second groove part has a second part located on the alignment film.

16. The liquid crystal display device according to claim 13, wherein the second substrate includes:

a second substrate body;

the shielding part formed on the second substrate body; and an alignment film formed so as to cover the shielding part and the second substrate body, and wherein the second groove part has:

a first part located on the alignment film above the shielding part; and a second part located on the alignment film above a location where the second substrate body is covered.

17. The liquid crystal display device according to claim 13, wherein the third insulation film partially forms a side face of the second groove part located at an end part of the second substrate in the peripheral region.

18. The liquid crystal display device according to claim 17, wherein a part of the third insulation film is thicker than any other part of the third insulation film located in the display region.

19. The liquid crystal display device according to claim wherein the first substrate includes a spacer at an end part of the first substrate in the peripheral region, and wherein a part of the third insulation film is disposed apart from the spacer.

* * * * *